Dec. 26, 1961 R. H. REEVES 3,014,712
VEHICLE WHEEL SUSPENSION
Filed Aug. 11, 1959

Robert H. Reeves
INVENTOR.

BY James F. Weiler
Jefferson D. Giller &
William A. Stout
ATTORNEYS

United States Patent Office 3,014,712
Patented Dec. 26, 1961

3,014,712
VEHICLE WHEEL SUSPENSION
Robert H. Reeves, 2001 Gulf Bldg., Houston 2, Tex.
Filed Aug. 11, 1959, Ser. No. 833,086
3 Claims. (Cl. 267—58)

This invention relates to wheel suspensions for vehicles and, more particularly, to an improved torsion type wheel suspension for vehicles.

Various types of vehicle wheel suspension systems have been utilized in the past. All of these systems, however, are subject to varying difficulties including stability, shock to the steering column and chassis, alignment, numerous grease joints per unit, complexity and expense of manufacture and maintenance.

It would be advantageous to provide a suspension system for wheels for vehicles, and particularly for the front wheels of automobiles, which provides stability, eliminates shock to the steering column and chassis, eliminates alignment problems except for toe-in of the front wheels, requires only two grease joints per unit, which is more rigid than present suspension systems since there are no knuckle or ball joints, in which caster and camber adjustments are not necessary since they are readily and easily built into the suspension system. The present invention is directed to such a vehicle wheel suspension system having the above-mentioned advantages.

It is therefore an object of the present invention to provide a vehicle wheel suspension system which is more stable and far more rigid than suspension systems utilized in the past.

Still a further object of the present invention is the provision of a vehicle wheel suspension system which eliminates shock to the steering column and chassis.

Still a further object of the present invention is the provision of such a vehicle wheel suspension system which eliminates alignment problems except for toe-in alignment of the front wheels.

Yet a further object of the present invention is the provision of such a vehicle wheel suspension system in which the number of grease joints per unit is reduced to two.

Yet a further object of the present invention is the provision of a torsion type vehicle wheel suspension system in which wear is reduced to a minimum in that the suspending bar travels an extremely short distance in wrapping around the suspension rod, which is simplified in construction, which is reliably efficient in operation and which is inexpensively manufactured and maintained.

Figure 1:
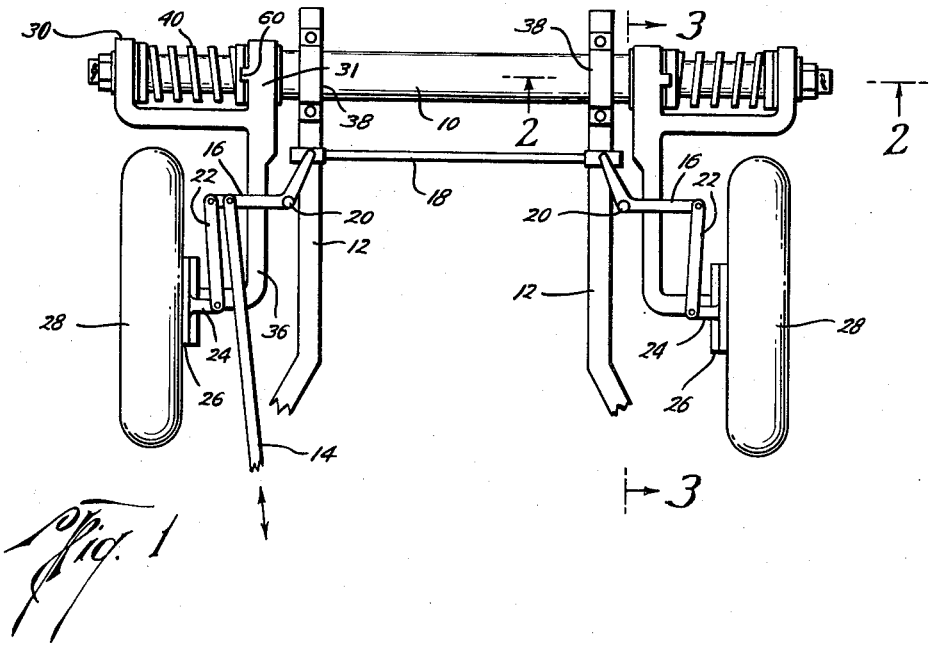
Figure 2:
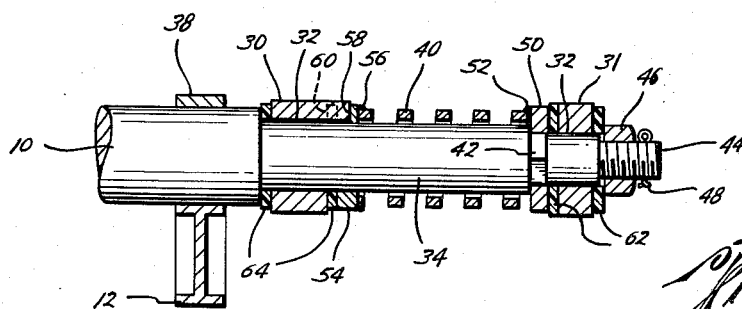
Figure 3:
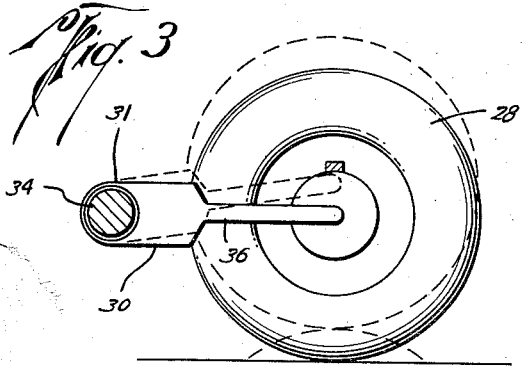

Other and further objects, features and advantages of the present invention will be apparent from the following description of a presently preferred example of the invention, given for the purpose of disclosure and taken in conjunction with the accompanying drawings, in which like character references designate like parts throughout the several views, and where FIGURE 1 represents a fragmentary schematic plan view of an automobile axle, frame and wheel assembly provided with a vehicle wheel suspension system according to the invention, FIGURE 2 is a cross-sectional view taken along the line 2—2 of FIGURE 1, and FIGURE 3 is a side sectional view taken along the line 3—3 of FIGURE 1.

Referring now to the drawing, and particularly to FIGURE 1, a fragmentary view, in plan, of an automobile frame is illustrated which includes the frame member 12 of a vehicle, not shown. The view shown, of course, is the front end of an automobile and illustrates a link arm 14 connected to a bell crank 16 which is connected to the tie rod 18, which in turn is connected at its other end to an identical bell crank 16. The bell cranks 16 are pivotally connected by studs to the frame so that upon movement of the link arm 14 the bell cranks 16 are moved in their normal manner for steering the automobile.

Connected to the outer extremities of the bell cranks 16 are the links 22 which are pivotally connected to the steering arms 24 which in turn are connected or project from the axle members 26.

Thus, movement of the link arm 14 causes the wheels 28 to be turned in the usual manner.

It is noted that the suspension systems for both wheels are identical. Accordingly, the description will be with respect to one of these although it will be understood that each has the same corresponding parts.

Thus, each wheel assembly includes a generally U-shaped suspending arm 30 having the axially-spaced arms 31 which are provided with the openings 32 through which the outer extremity 34 of the suspending bar 10 extends. The U-shaped suspending arm 30 has a crank arm 36 extending rearwardly adjacent its inner portion, the free extremity to which is connected the wheel 28 in the usual manner.

It should be noted that the suspending bar 10 is rigidly connected to the frame members 12 by means of the brackets 38, although the suspending bar 10 may otherwise be rigidly secured to the frame member 12 in any suitable manner or may be welded thereto or be an integral part thereof.

A torsion spring 40 is disposed about the terminal end 34 of the suspending bar 10, one end of which is rigidly connected to one arm 31 of the suspending arm 30 and the other end of which is connected to the suspending bar 34, as presently described, so that the torsion in the spring 40 provides a yielding connection between the suspending arm 30 and the suspending bar 34.

The structure and manner of securing the torsion spring 40 to the suspending arm 30 and suspending bar 34 are best illustrated in FIGURE 2, to which reference is now made.

The suspending bar extremity 34 is provided with a noncircular portion, such as the hexagonal portion 42 adjacent its outer end and terminates with the threaded bolt 44 about which is secured the nut 46 and through which is provided the cotter key 48 which secures the suspending bar 34 through the openings 32 in the axially-spaced arms 31.

A coacting hexagonal nut 50 is disposed about the hexagonal surface 42 thereby preventing rotation of the nut 50 with respect to the suspending bar 34, to which one end of the torsion spring 40 is rigidly secured, such as by welding diagrammatically illustrated at 52.

The other end of the torsion spring 40 is rigidly secured to the nut 54, such as by welding diagrammatically illustrated at 56 which nut 54 includes a keyway 58 into which the key 60 of one of the arms 31 of the suspending arm 30 is disposed, as best seen in FIGURE 1.

Thus, the torsion spring is rigidly secured at one end to the suspending bar end 34 and rigidly secured at the other end to the suspending arm 30. This, of course, may be accomplished in any desired manner.

It is noted that the openings 32 through the axially-spaced arms 31 of the suspension arm 30 are circular, when viewed in cross-section, and are free to rotate about the generally circular outer surface of the suspending bar end at that point.

Referring again to FIGURE 2, a pair of grease seals 62 is provided about the outer extremity of the suspending arm 30 and on opposite sides of the arms 31. A similar pair of grease seals 64 is provided about the inner extremity of the suspending bar 34 in the same manner.

Thus, it is only necessary to provide grease at these two points for adequate lubrication of the suspension system.

In assembling the suspension system, the vehicle is raised as if to change a tire. The wheel end 36 of the suspending arm 30 is permitted to drop to the floor. The suspending arm 30 with coil spring 40 in place is placed about the suspending arm as shown and the notched section 54 is placed into engagement with the key 60 thereby locking the torsion spring 40 against movement at the inner end. At the same time, the nut 50 is placed about the coacting hexagonal surfaces 32 thereby locking the torsion spring 40 at the outer end.

The grease seals, of course, are also at the same time placed about the arms 31 and suspending bar 34, as illustrated, the nut 46 is screwed on and the cotter key 48 put in place.

In use, as the weight of the car is placed on the wheel, the suspending arm 30 causes the coil spring or torsion spring 40 to tighten by wrapping around the suspending bar 34. It is noted that the suspension system or point of suspension is in front of or forward of the wheel it is suspending. Thus, the wheel trails the point of suspension. Any bumps on a wheel sends it up and the suspending arm wraps around the horizontal suspending bar with no shock being transferred to the chassis. The suspending arm, as the wheel goes over a bump, causes the torsion spring to tighten by wrapping around the suspending bar with no resultant movement other than this wrapping around action.

While the present invention is particularly suited and adapted for front wheels of automobiles, it may be used to suspend any wheels for any types of vehicles.

The present invention, therefore, is well suited and adapted to carry out the objects and attain the advantages and ends mentioned and others inherent therein.

While a presently preferred embodiment of the invention has been given for the purpose of disclosure, numerous changes in details of construction and arrangement of parts may be made which are within the spirit of the invention as defined by the scope of the appended claims.

What is claimed is:

1. A vehicle wheel suspension comprising, a generally horizontally-extending suspending bar, a suspending arm having axially-spaced legs forming a generally U-shape, axially-aligned journal means in the legs journaling the suspending arm about the suspending bar, a single torsion spring disposed about the suspending bar and between the axially-spaced arms, means rigidly connecting one end of the torsion spring to one of said arms, means rigidly connecting the other end of the spring to the suspending bar, a crank arm extending rearwardly from the inner leg of the suspending arm, the terminal end of which extends outwardly, and wheel attaching means at the terminal end.

2. The vehicle wheel suspension of claim 1 including a pair of grease seals disposed about the suspending bar and at opposite sides of each spaced arm.

3. A vehicle wheel suspension comprising, a generally horizontally-extending suspending bar, a generally U-shaped suspending arm, the axially spaced legs of which have axially-aligned journal means journaling the suspending arm to the suspending bar, a single torsion spring disposed about the suspending bar and between the U-shaped legs, means rigidly connecting one end of the spring to the suspending arm, means rigidly connecting the other end of the spring to the suspending bar, an arm extending rearwardly from the inner one of the legs of the suspending arm, the terminal end of which extends outwardly, and wheel attaching means adjacent the terminal end.

References Cited in the file of this patent

UNITED STATES PATENTS

| | | |
|---|---|---|
| 1,991,491 | Calkins et al. | Feb. 19, 1935 |
| 2,203,095 | Kreissig et al. | June 4, 1940 |
| 2,609,212 | McMurtrie | Sept. 2, 1952 |
| 2,714,517 | Powell | Aug. 2, 1955 |
| 2,863,657 | Altherr | Dec. 9, 1958 |